May 12, 1942.                J. J. BLACK                    2,282,414
                      TRACTOR-TRAILER COMBINATION
                        Filed March 24, 1939           3 Sheets-Sheet 1

INVENTOR.
BY James J. Black
Word & Ward
ATTORNEYS

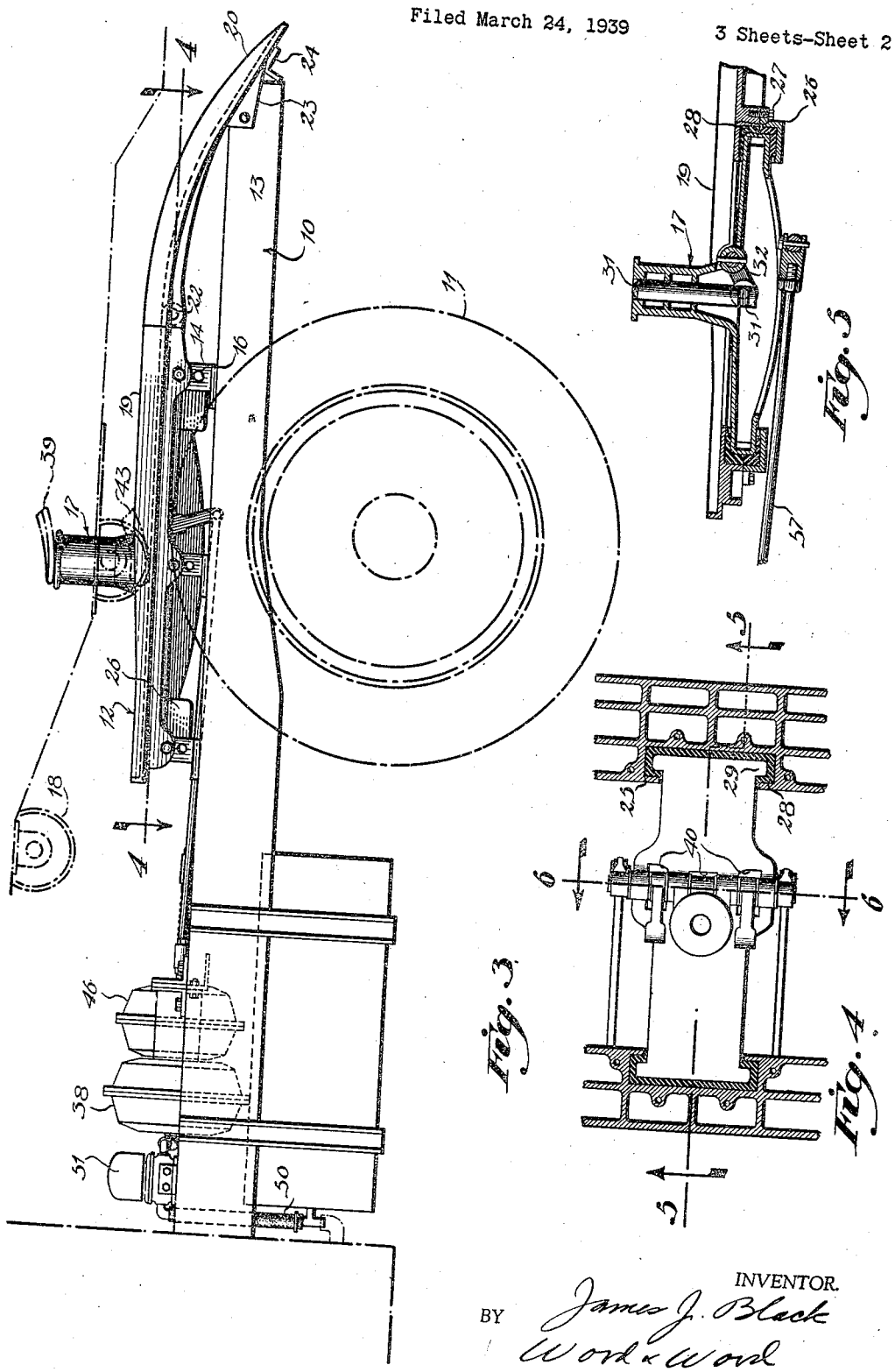

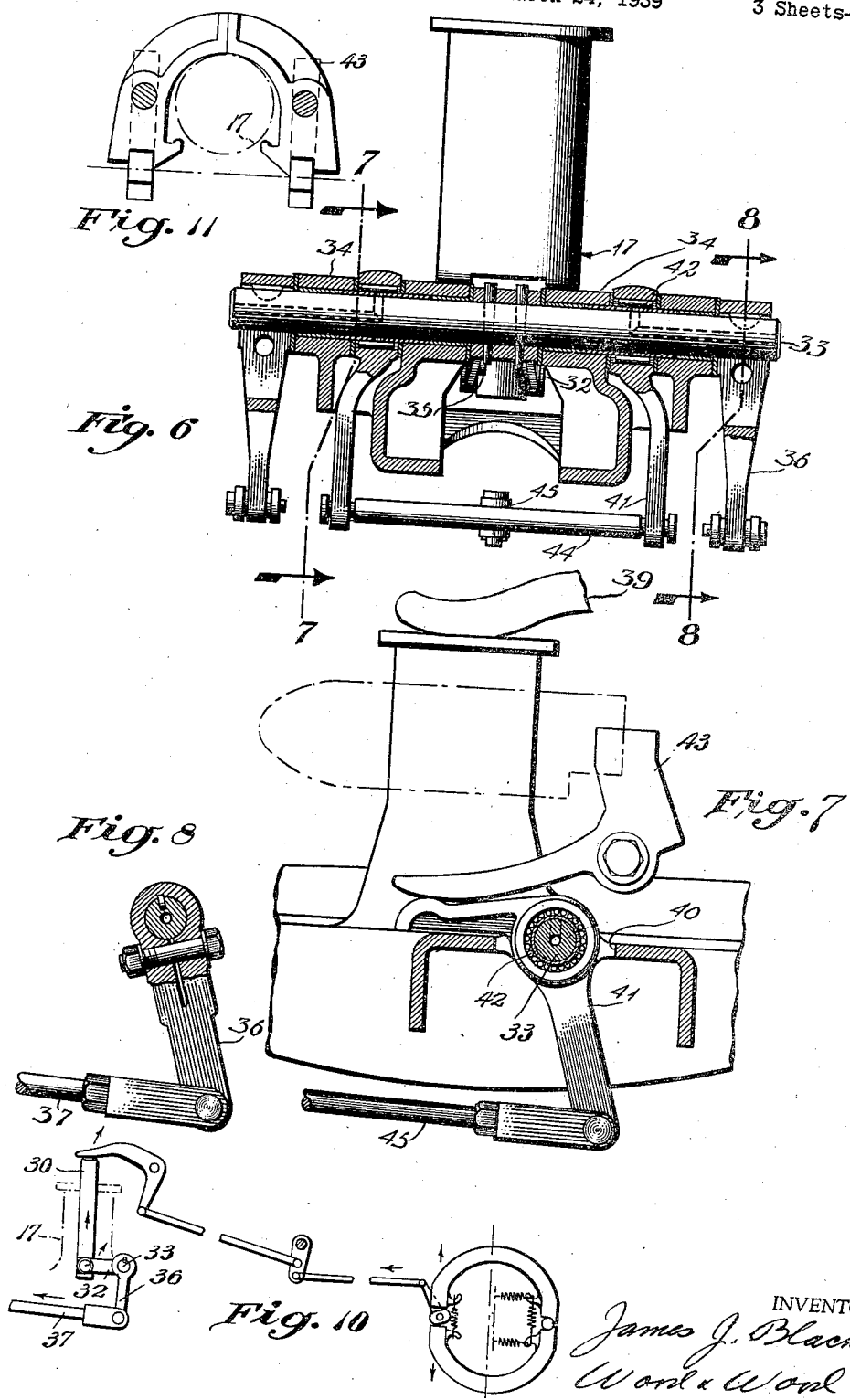

Patented May 12, 1942

2,282,414

UNITED STATES PATENT OFFICE 2,282,414

TRACTOR TRAILER COMBINATION

James J. Black, Cincinnati, Ohio, assignor, by mesne assignments, to The Fifth Third Union Trust Company of Cincinnati, Ohio Application March 24, 1939, Serial No. 263,957

4 Claims. (Cl. 280—33.1)

This invention relates to tractor trailer combinations and is particularly directed to the construction and arrangement of the tractor fifth wheel including the king pin as well as the control means for operating the coupling and trailer brakes.

Heretofore, it has been the practice to provide a spring mounting for the king pin whereby the king pin could yield or give under the impact of coupling. In this manner breakage of the king pin has been prevented. The operator, in coupling the tractor and trailer, has a tendency to engage the king pin and coupling jaws too suddenly. As a matter of fact, a reasonably sudden interengagement is desirable to effect a sure coupling, but, with this in mind, the operator slams the parts together harder than he should. The spring mounting has been used to absorb the undue shocks which result.

The main trouble in the past has been that there has been too much king pin movement. This excessive king pin movement has interfered with and even disrupted the operative arrangement of the jaw and coupling means and the trailer brake operating means, since these parts are usually associated with the king pin and are extended to the chassis frame. They are usually mounted directly on the king pin element and, of course, shift as the king pin shifts. Moreover, the yieldable mountings of the past have not absorbed the lateral shocks or those which occurred when the engagement was off the longitudinal line of the tractor.

It has been the object of the present inventor to provide a cushioned mounting for the king pin absorbing all shocks delivered to the king pin regardless of the direction from which they come. At the same time, it has been provided that the movement of the king pin cannot be excessive and, therefore, cannot disturb or destroy the operative relationship of the coupler operating means and the trailer brake operating means and their respective linkages. For this purpose, rubber elements have been interposed between the king pin element and the fifth wheel. These elements have been arranged so as to completely insulate the king pin element against shock.

In another phase of the present invention, the operating means for the uncoupling apparatus and the trailer brake applying apparatus respectively have been pneumatic, preferably vacuum and independently operable. Accordingly, it has been possible for the operator to accidently operate the uncoupling means when the brakes have not been applied on the trailer. It has been the object of the present inventor to provide a pneumatic intercontrol means which prevents operation of the coupler operating means unless the trailer brakes have been applied. This is accomplished by the provision of a valve permitting the creation of a vacuum in the brake control cylinder and the line to the coupler control cylinder and a valve for connecting the aforesaid line to the coupler control cylinder. Thus, it is arranged that a vacuum is only created for use in the coupling cylinder when the brakes have been operated. Through this invention, it is only possible to cause operation of the coupling means when the vacuum has been created and at any other time operation of the coupling control valve is without effect.

Other objects and certain advantages will be more fully apparent from a description of the drawings in which:

Figure 3 is a side view of the rear portion of the truck.

Figure 4 is a sectional view taken on line 4—4, Figure 3, detailing the mounting of the king pin element.

Figure 5 is a sectional view taken on line 5—5, Figure 4, further detailing the king pin mounting.

Figure 6 is a sectional view taken on line 6—6, Figure 4, illustrating the assembly of the brake and coupler operating arms and levers on a common shaft.

Figure 7 is a sectional view taken on line 7—7, Figure 6, illustrating the operating arm assembly for the coupling means.

Figure 8 is a sectional view taken on line 8—8, Figure 6, illustrating the connection of one of the brake arms to the cross shaft.

Figure 10 is a diagrammatic view showing the brake operating arrangement.

Figure 11 is a view looking down on the king pin and showing the coupling jaws.

Figure 1:
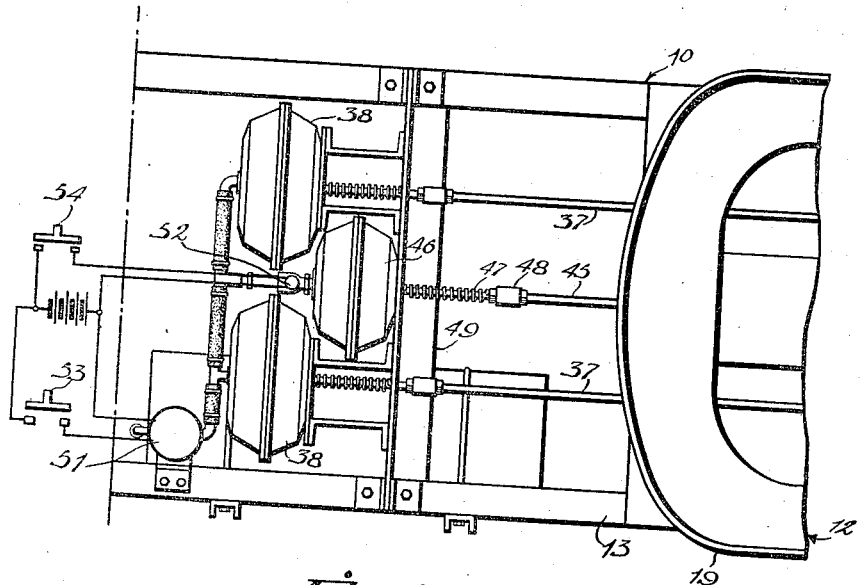
Figure 1 is a fragmentary top plan view of the rear end of a truck or trailer illustrating the vacuum cylinders and control means of the present improvements.
Figure 2:
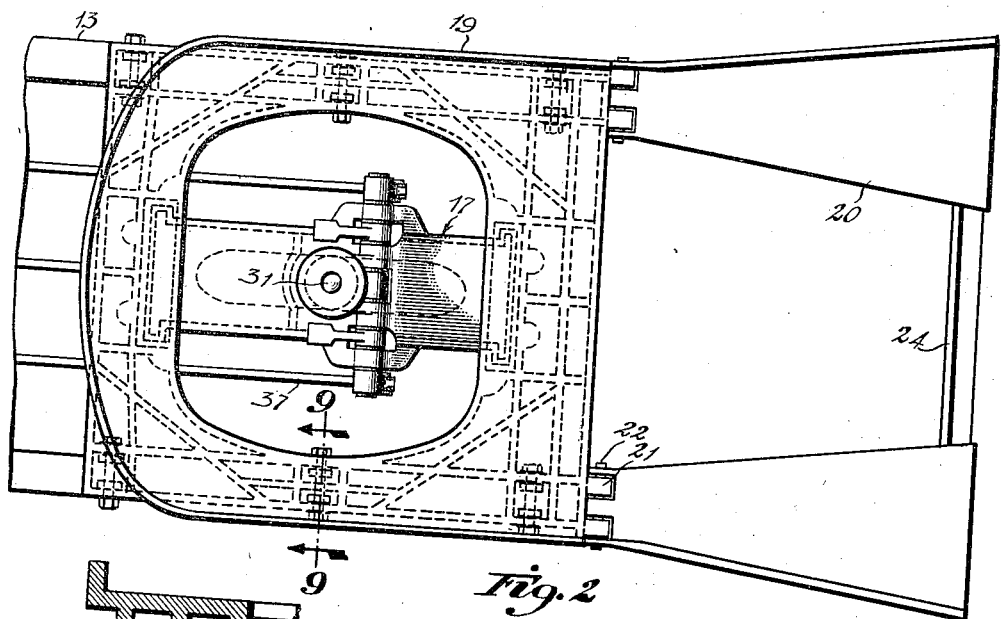
Figure 2 is a fragmentary plan view of the rear portion of the truck, showing the fifth wheel and king pin.
Figure 9:
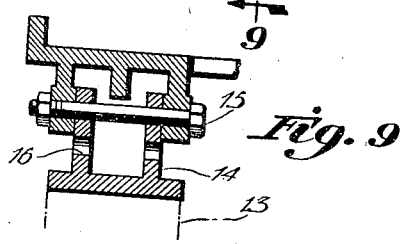
Figure 9 is a sectional view taken on line 9—9, Figure 2, illustrating one of the supporting feet for the fifth wheel.

Referring to the drawings, the tractor or truck chassis is generally indicated at 10. Only the rear portion of the truck is shown. The general arrangement, including the rear wheels 11, appears best in Figure 3. The lower fifth wheel 12 is mounted on the side rails 13 of the chassis. Foot elements 14 are utilized for supporting and mounting the fifth wheel on the rails. Attaching bolts 15 traverse depending flanges of the fifth wheel and are selectively engageable through either of a pair of vertically spaced openings 16 in each of the foot elements. By selective use of the openings 16, the operator may vary the height of the fifth wheel.

The fifth wheel is open through its center and thus may be said to constitute a sort of frame for the king pin element 17. The frame work, constituted by the fifth wheel, includes a multiplicity of downwardly extended flanges or ribs for reinforcing the structure. The top of this framelike fifth wheel is flat so as to constitute a runway and support for the wheels 18 on the forward end of the trailer. A flange 19 is disposed entirely around the fifth wheel with the exception of its approach end.

Skids 20 are provided. These skids are of curved form and extend from the plane of the fifth wheel and curve downwardly to a level where they will be engaged successively by the pairs of forward wheels of the trailer in the operation of coupling. The ends of these skids, which are attached to the fifth wheel, are bifurcated for engagement over lugs 21 projected rearwardly from the fifth wheel. Pins 27 traverse the lugs and bifurcations. The rear or lower ends of the skids include flanges 23 which are fixed to the rails of the chassis. A cross rail 24 ties the lower ends of the skids together.

The king pin element 17 is of elongated form and is generally hollow. Its base portion is supported or suspended in rubber. The fifth wheel, at its front and rear within the inner margin of its frame, provides cups containing the rubber and receiving the ends of the bolster or base portion of the king pin. Specifically, the socket portions are indicated at 25. Their upper parts are cast integrally with the fifth wheel and the lower parts are in the form of caps 26 drawn upwardly against the cast portions by means of screws 27. These sockets, thus constituted, extend over just a portion of the width of the opening in the fifth wheel but are arranged so as to dispose the king pin on the axis of the opening in the fifth wheel.

The rubber inserts or shock absorbers 28 are in sections corresponding to the sections of the sockets. That is to say, the assemblies are split on horizontal lines so as to facilitate assembly and replacement. Specifically, the rubber elements provide socket portions 29 extended laterally from a main portion so as to receive the lateral extensions on the forward and rear ends of the king pin element. Thus the rubber surrounds or encases the attachment ends of the king pin element. The rubber is held under compression by means of the screws drawing the caps upwardly.

This rubber supporting means thus provides a cushion action in all directions, absorbing the shocks of coupling and the draft shocks. At the same time, the movement of the king pin is not excessive but within reasonable bounds and the brake and uncoupling connections or assemblies are not disturbed or displaced. It must be born in mind that these assemblies connect directly to the king pin element and undue movement thereof would interfere with the correct braking and uncoupling actions.

The king pin, as stated, rises from the bolster portion directly centrally thereof. It is tubular and contains the vertically disposed truck brake operating pin 30. The lower end of this pin is notched on each side, as at 31, and is straddled by the bifurcated free end of a lever 32 fixed to a cross shaft 33 mounted in the cross lugs 34 of the king pin element, just to the rear of the king pin. Trunnion pins 35 extend into the cross grooves 31 and provide a flexible connection to the brake operating pin 31. Actuating arms 36 are fixed at the respective outwardly extended ends of the shaft 33 and are actuated through rods or links 37 disposed longitudinally of the chassis and attached at the rear ends to the pistons (not shown) of pneumatic brake cylinders 38. The upper end of the brake pin engages the brake lever 39 disposed on the trailer. The remainder of the mechanism, from the lever 39 to the brake shoes of the trailer, is conventional and, therefore, is not illustrated.

The king pin element is slotted, as at 40, at each side of the king pin and these slots are traversed by the cross shaft 33. The coupling jaw operating arms 41 are rotatably mounted on roller bearings 42 on the shaft within these clearances. The arm portions which actuate the lever 43, operating the coupling and uncoupling means of the trailer, are disposed forwardly at each side of the king pin (see Figure 7). Integral leverage portions of the arms extend downwardly and are connected by a cross rod or equalizing bar 44. The operating link 45 is connected to the center of this bar. The connection provides for universal movement, that is, rotation in a horizontal as well as a vertical plane. The rear end of the rod or link is connected to the actuating piston (not shown) of the vacuum cylinder 46, which is disposed between the braking cylinders.

Normally, these links are maintained in the positions shown, that is, brake release and coupling position by means of coil springs 47, disposed under compression, about the links and between abutments 48 thereon and the respective vacuum cylinders. The vacuum cylinders are attached to a cross rail 49 in alignment with the links.

A common vacuum line 50 extends from the vacuum creating means of the truck to a solenoid operated brake control valve 51, fixed to the chassis side rail. This vacuum line extends to all three cylinders. A separate solenoid operated valve 52 is provided for the coupler operated cylinder. Normally, this last named solenoid operated valve permits atmospheric pressure in the coupling operating cylinder. In the same manner, the main control valve 51 relieves the vacuum in the brake operating cylinders. These solenoids are controlled by means of respective push buttons 53, 54 in the cab of the truck. When the operator desires to apply the brakes on the truck and trailer, he actuates the foot pedal operated push button 53 controlling the main valve 51 and this creates a vacuum in the line extending to the brake cylinders and in the line leading up to the uncoupling cylinder. If he desires to uncouple, he pushes both buttons and this permits the creation of vacuum in the uncoupling cylinder due to the operation of the solenoid valve controlling this cylinder.

Now, unless the brake cylinder control valve has been operated to set the brakes, it is impossible to operate the uncoupling means since there is no vacuum in the line leading to the uncoupling cylinder. This is a definite safeguard since the operator may accidentally press or touch the button or control means for the uncoupling of the jaws. As stated, if he does so, accidentally, the operation of the valve is ineffective since the line is at atmospheric pressure. Otherwise stated, it is necessary that both buttons be operated before uncoupling can take place.

Having described my invention, I claim:

1. In a tractor trailer combination, a chassis for said tractor, a fifth wheel on said tractor, a king pin element, rubber means for mounting said king pin element in said fifth wheel, a cross shaft mounted in said king pin element, levers on said shaft for operating the brakes on said trailer and the coupling means on said trailer respectively, the latter means operative freely rotatively relative to the shaft, and means for operating the respective leverages, said king pin having a limited cushioned action in all directions, said movement being insufficient to disturb the operative connections to the respective levers.

2. In a tractor of the type adapted to pull a trailer, a chassis for said tractor, a king pin element, rubber means for mounting said king pin element on said chassis, a cross shaft mounted in said king pin element, levers on said shaft for operating brakes on said trailer and coupling means on said trailer, means for operating the respective leverages, links between said last named means and said levers, said king pin having a limited cushioned action in all directions, said movement being insufficient to disturb the operative connections to the respective levers.

3. In a tractor of the type to which a trailer is coupled, a chassis, a king pin element therein, a cross shaft mounted in said king pin element, a trailer brake applying lever attached to said shaft centrally thereof, an arm attached to each end of said shaft, actuating links attached to said arms, arms loosely mounted on said shaft including fingers adapted to operate coupling means on the trailer, a stabilizing bar connecting said arms, and an actuating link connected to said bar centrally thereof.

4. In a tractor of the type adapted to pull a trailer, a chassis for said tractor, a king pin element, rubber means for mounting said king pin element on said chassis, support means carried by said king pin element, and operating mechanisms on said support means operatively associated with service mechanisms on said trailer, said king pin element having a limited cushioned action in all directions, said movement being insufficient to disturb the operative connections to the respective operating mechanisms.

JAMES J. BLACK.